Patented May 4, 1926.

1,583,258

UNITED STATES PATENT OFFICE.

DONALD G. ROGERS AND LLOYD C. DANIELS, OF BUFFALO, NEW YORK, ASSIGNORS TO NATIONAL ANILINE & CHEMICAL COMPANY, INC., OF NEW YORK, N. Y., A CORPORATION OF NEW YORK.

PRODUCTION OF VAT DYESTUFF.

No Drawing. Application filed July 2, 1921. Serial No. 482,147.

*To all whom it may concern:*

Be it known that we, DONALD G. ROGERS and LLOYD C. DANIELS, citizens of the United States, residing at Buffalo, county of Erie, State of New York, have invented certain new and useful Improvements in the Production of Vat Dyestuff; and we do hereby declare the following to be a full, clear, and exact description of the invention, such as will enable others skilled in the art to which it appertains to make and use the same.

This invention relates to improvements in the production of vat dyestuffs, and particularly to the dyestuff known as dibenzanthrone (violanthrone) produced by the fusion of benzanthrone with caustic alkali.

The present invention is based upon the discovery that a greatly reduced amount of caustic alkali can be used in the fusion of benzanthrone, and the fusion can be carried out in a materially reduced period of time and with increased yields of a superior product, by adding to the reaction mixture a suitable inert solvent or diluent, for example, kerosene or similar petroleum distillate, together with a reducing agent, for example, dextrine.

The invention will be further illustrated by the following specific example, the parts being by weight:

A mixture of 100 parts of caustic potash and 420 parts of mineral oil (obtained from steam distilled kerosene) having a boiling point above 230° C. is heated to 215°–230° C. and to this heated mixture is gradually added with agitation an intimate mixture of 24 parts of dextrine and 100 parts of sublimed benzanthrone (analyzing 94–96% benzanthrone), and the resulting mass maintained at this temperature until the reaction is complete. The fusion mass is then allowed to cool with agitation to a temperature of 50° C. or lower, and the mineral oil decanted off. Warm water is added to the residue and the resulting aqueous suspension allowed to stand until the remainder of the mineral oil has separated as an upper layer, which is then removed. The dye is then precipitated by heating to boiling and blowing air through the aqueous suspension. The precipitated dye is then filtered off and washed free from alkali.

The dye produced in this way is of superior brightness and strength, and is obtained in excellent yields. It is obtained at the end of the fusion, by cooling of the melt with agitation, as a granular product, which can be readily handled in its further treatment. The product can be used itself as a dyestuff or it can be used as an intermediate for the preparation of other dyes.

Instead of using mineral oil in the manner described in the above example, other suitable inert solvents or diluents can be similarly used, for example, other petroleum or coal-tar fractions or distillates which have a melting point below and a boiling point at or above that of the temperature of the fusion. The use of solvents or diluents that begin to boil at or above the desired temperature of the fusion assist in controlling the temperature.

Instead of using dextrine as a reducing agent during the fusion, other suitable reducing agents can be similarly used, for example, starch, cellulose, and other carbohydrate material, aminophenols, etc.

In carrying out the invention, the manner or order of admixing the ingredients, their relative proportions, and the temperatures used, can be varied to a considerable extent.

Among the advantages which the present process presents may be mentioned a radical reduction in the amount of caustic potash required for the fusion, ease of temperature control of the process, reduction or elimination of frothing during the fusion, ease of recovery of the solvent or diluent used, protection of the reaction mass during and subsequent to the reaction by the solvent layer, so long as the solvent is left with the product, and the production of a superior product with increased yield.

In referring, in the accompanying claims, to a benzanthrone compound, we use this term as a generic term to include benzanthrone itself, or a derivative or an analogue thereof.

The term "fusion" is also used to refer to the heating of the benzanthrone compound with caustic alkali in the presence of the indifferent diluent and reducing agent, whether or not actual melting of either or both the benzanthrone compound and alkali, or solution of either or both in the inert diluent, takes place.

Claims:

1. The improvement in the production of a coloring matter known as dibenzanthrone which comprises subjecting benzanthrone to the action of caustic potash at a temperature of about 215°–230° C. in the presence of mineral oil having a boiling point of about 230° C. and in the presence of a reducing agent.

2. The improvement in the production of a dyestuff known as dibenzanthrone which comprises subjecting benzanthrone to fusion with caustic potash at a temperature of about 215°–230° C. in the presence of a mineral oil having a boiling point at or above the temperature of the fusion and in the presence of a carbohydrate.

3. The improvement in the method of producing the coloring matter known as dibenzanthrone which comprises gradually adding a mixture of benzanthrone and dextrine to a mixture of caustic potash and mineral oil maintained at a temperature of about 215°–230° C.

4. The improvement in the production of a coloring matter known as dibenzanthrone which comprises subjecting benzanthrone to fusion with caustic potash at a temperature of about 215°–230° C. in the presence of a petroleum distillate having a boiling point above 215°–230° C. and in the presence of dextrine.

5. The improvement in the production of vat dyes which comprises subjecting a benzanthrone compound to the action of caustic potash at a temperature of about 215°–230° C. in the presence of a reducing agent and of an indifferent diluent having a boiling point of about 215°–230° C., said diluent being a liquid at ordinary temperature.

6. The improvement in the production of a coloring matter known as dibenzanthrone which comprises subjecting benzanthrone to fusion with caustic potash at a temperature of about 215°–230° C. in the presence of a carbohydrate and of an indifferent diluent having a boiling point at about the temperature of fusion, said diluent being a liquid at ordinary room temperature.

7. The improvement in the production of a coloring matter known as dibenzanthrone which comprises subjecting benzanthrone to fusion with caustic potash at a temperature of about 215°–230° C. in the presence of dextrine and of an indifferent diluent having a boiling point at about the temperature of fusion, said diluent being a liquid at ordinary room temperature.

In testimony whereof we affix our signatures.

LLOYD C. DANIELS.
DONALD G. ROGERS.